United States Patent [19]
Mott et al.

[11] Patent Number: 5,588,926
[45] Date of Patent: Dec. 31, 1996

[54] SELF-GUIDED CHAIN ASSEMBLIES

[75] Inventors: Philip J. Mott; David C. White, both of Dryden; Thomas J. Becker, Auburn, all of N.Y.

[73] Assignee: Borg-Warner Automotive, Inc., Sterling Heights, Mich.

[21] Appl. No.: 425,575

[22] Filed: Apr. 20, 1995

[51] Int. Cl.⁶ .................................................. F16G 13/04
[52] U.S. Cl. .......................................................... 474/212
[58] Field of Search ............................ 474/84, 85, 156, 474/206, 212, 245, 900, 207, 210, 226, 229, 230

[56] References Cited

U.S. PATENT DOCUMENTS

| | | |
|---|---|---|
| 959,046 | 5/1910 | Belcher . |
| 1,835,406 | 12/1931 | Kirsten . |
| 1,956,942 | 5/1934 | Belcher et al. . |
| 4,117,738 | 10/1978 | McKeon . |
| 4,342,560 | 8/1982 | Ledvina et al. ............... 474/157 |
| 4,758,210 | 7/1988 | Ledvina ........................ 474/212 |
| 4,915,675 | 4/1990 | Avramidis .................... 474/213 |
| 5,397,280 | 3/1995 | Skurka ..................... 474/156 X |
| 5,427,580 | 6/1995 | Ledvina et al. ................. 474/84 |
| 5,437,581 | 8/1995 | Ledvina et al. ................. 474/85 |
| 5,470,282 | 11/1995 | Ledvina et al. ............... 474/156 |

FOREIGN PATENT DOCUMENTS

| | | |
|---|---|---|
| 56-4780 | 1/1981 | Japan . |
| 3-28348 | 3/1991 | Japan . |

Primary Examiner—Roger J. Schoeppel
Attorney, Agent, or Firm—Willian Brinks Hofer et al.; Greg Dziegielewski

[57] ABSTRACT

A self-guiding chain assembly includes a silent chain with inner and outer links having depending toes. Traditional guide links are replaced by inverted tooth outer links with a crotch of lesser height than the crotch of the inner links. The outer links perform the self-guiding function and act to maintain the chain on the sprockets. The chain has particular application in engine timing systems that utilize phased chains and sprockets.

17 Claims, 4 Drawing Sheets

SELF-GUIDED CHAIN ASSEMBLIES

This application relates to the subject matter of U.S. application Ser. No. 08/131,473, filed Oct. 4, 1993, now U.S. Pat. No. 5,427,580, which is a continuation-in-part application of U.S. application Ser. No. 07/885,194, filed May 19, 1992, now abandoned, entitled "Phased Chain Assemblies," which is incorporated herein by reference.

BACKGROUND OF THE INVENTION

The present invention relates generally to power transmission chains. The invention has particular application to power transmission chains of the inverted tooth or silent chain variety, which are used in engine timing applications as well as in the transfer of power from a torque converter to a transmission or in a transfer case of a four-wheel drive vehicle.

SiLent chains utilize links with inverted teeth for the transmission of power. Sets or rows of inverted tooth links are interleaved and connected by pins to form the chain assembly. Guide links are press fit on the pins and included along the outside of the link rows to maintain the chain on the sprockets. In the present invention, the chain construction eliminates the need for guide links. Instead of guide links, the chain uses inverted tooth links with differing crotch heights to both transmit power and maintain the chain on the sprockets. The different crotch heights provide a self-guiding function and avoid the need for conventional guide links.

The present invention has particular application to chain assemblies in which the sprockets are offset, or phased, to modify the impact noise spectrum and chordal action noise spectrum. In a phased chain system, a single chain assembly is replaced by two side-by-side chains that are phased or offset by one-half pitch. By eliminating the need for conventional guide links, the present invention permits a narrower chain for use in the phased chain system. The present invention also has particular application to engine timing systems where narrow chain systems are typically required.

As previously mentioned, silent chains are typically formed of interleaved sets of inverted tooth links. A set or rank of links is assembled from several links positioned alongside of or adjacent to each other. The links are connected by pivot members or pins, which are typically round pins or rocker joint pins received in a pair of apertures. An example of silent chain is found in U.S. Pat. No. 4,342,560, which is incorporated herein by reference.

Conventional silent chains typically include both guide links and inverted tooth links. The guide links are positioned on the outside edges of alternate sets of links. The guide links typically act only to position the chain laterally on the sprocket. Guide links do not mesh with the sprocket.

The inverted tooth links, or sprocket engaging links, provide the transfer of power between the chain and sprocket. Each inverted tooth link includes a pair of apertures and a pair of depending toes or teeth. Each toe is defined by an inside flank and an outside flank. The inside flanks are joined at a crotch. The inverted tooth links are designed so that the links contact the sprocket teeth to transfer power between the chain assembly and the sprocket. The inverted tooth links, or driving links, contact the sprocket teeth along their inside link flanks or their outside link flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. A chain for an engine timing drive application is shown in U.S. Pat. No. 4,758,210, which is incorporated herein by reference. Various types of engine timing systems and configurations are also shown in U.S. application Ser. No. 08/131,473, filed Oct. 4, 1993, which is incorporated herein by reference.

Noise is associated with chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket and the mass of chain links contacting the sprocket at a particular moment or time increment.

Many efforts have been made to decrease the overall noise level and pitch frequency noise distribution in chain drives of the silent chain variety to minimize the objectionable effects of the pure sonic tones. Several of those efforts are discussed in the above-mentioned U.S. application Ser. No. 08/131,473, filed Oct. 4, 1993. The present invention finds application along with some of the noise reduction concepts discussed in the above-mentioned application, including randomization and phasing of the chain assemblies. However, the present invention has broader applications to chain systems that include, for example, non-phased chains and sprockets or non-randomization of link profiles.

Phasing the chain and sprocket relationship can reduce the number of chain link teeth (or mass) impacting the sprocket during a given time increment. Similarly, phasing the chain and sprocket relationship can alter or phase the chordal action or articulation of the chain and sprocket. The chain randomization and sprocket phasing modifications can result in a decrease in the overall noise level of the chain as well as pitch frequency noise level.

However, in the narrow chain assembly package requirements of modern engine timing systems, the use of a phased chain system can be difficult in that the single chain is often replaced by two chains that are used in side-by-side and phased relation. Modern engine timing systems often have as few as four links across the non-guide row and four or five links across the guide row. In order to package such a timing system in a phased system in approximately the same axial length, without decreasing the link thickness, the chain system requires the use of chains laced in a 2×2 lacing, i.e., two links across the guide row and two links across the non-guide row.

The use of two conventional (non-driving) guide links in the guide row results in the absence of a driving contact with the sprocket in every other row. Such a construction that fails to provide a driving or power transmission contact with the sprocket in every row can result in a noisier chain than a chain in which every row has a driving contact with the sprocket. The present invention is directed to overcoming such a disadvantage. In conjunction with the novel chain assembly, the present invention also provides a modified sprocket construction.

SUMMARY OF THE INVENTION

The present invention relates to a self-guided chain assembly. The guide links of a conventional inverted tooth chain are replaced with inverted tooth links having a crotch of a different height than the crotch of the inner links. Thus, the chain assembly has two types of links, i.e., higher crotch and lower crotch. The chain assembly is self-guided, or kept on the sprocket without guide links, by the outer links of different crotch height.

In its preferred embodiment, the chain includes inner links that have a crotch that is of greater height than the height of the crotch of the outer links. The crotch of the outer links is of a height that is below the horizontal line that connects the centers of the two apertures. Similarly, the crotch of the inner links may extend up to or beyond the horizontal centerline.

The tooth profiles of the inner links and outer links also differ to provide the self-guiding function. The inner links, with the higher crotch, also have toes that are located higher than the toes of the other links. In other words, the toes of the inner links do not extend as far downward from the apertures as the toes of the outer links.

The chain assembly may be laced in a 2×2 block fashion with two outer links interlaced with two side-by-side inner links. Alternatively, two outer links may be interlaced with three or more inner links laced in a block fashion. Many other lacing patterns are possible, including those which include interspacing of other links or a crotch on the outer links that is greater than the height of the crotch of the inner links.

The sprocket for the chain assembly is assembled in a laminate form. The outer layers of the sprocket have a different tooth profile than the inner layers. The sprocket outer layers have a tooth profile that is cut to mesh with the tooth profile and crotch height of the outer links. Similarly, the sprocket inner layers have a tooth profile that is cut to mesh with the tooth profile and crotch height of the inner links.

The present invention has particular application with phased chain assemblies or systems. That is, transmission, transfer case or engine timing systems in which the sprockets have two portions or separate assemblies and the sprocket portions are offset or phased with respect to one another, with single or multiple chains.

Each of these embodiments, as well as certain other embodiments, may include a plurality of chain assemblies, including assemblies of two, three, or four chain strands. Additionally, the sprockets may be phased ¼, ⅓ or ½ tooth, as well as various other amounts of pitch. Moreover, the dual chain assemblies may be spaced along the shaft, and not necessarily as part of a split sprocket.

In each chain assembly, the links are interleaved to form sets of links. Each link includes a pair of apertures, with an aperture from one set of links being aligned for interlacing with an aperture from an adjacent set of links. Pivot members, in the form of round pins or rocker joints, are utilized to connect the adjacent sets of links through the apertures, and to allow pivoting of the sets of links with adjacent sets.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
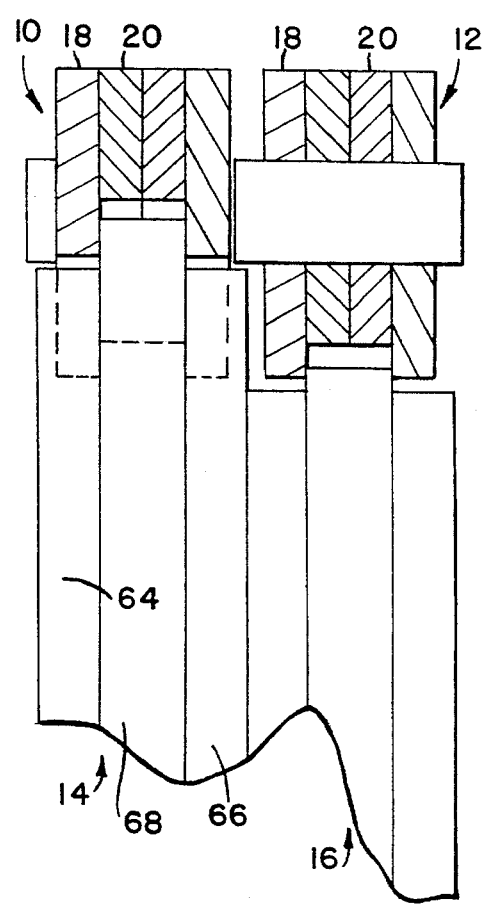
FIG. 1 is a schematic illustration showing phased chains having the assembly of the present invention and a laminated sprocket of the present invention.
Figure 2:
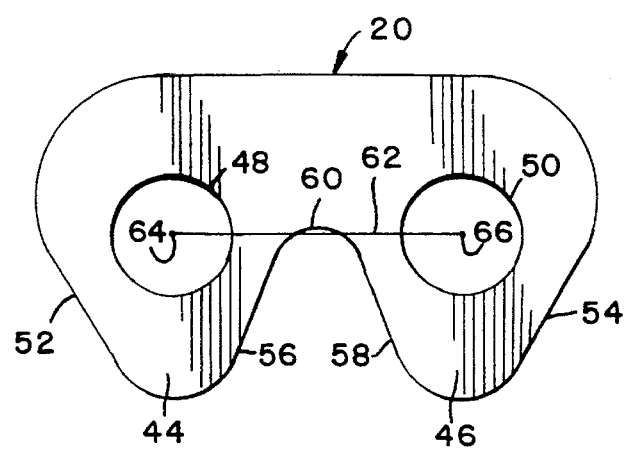
FIG. 2 is a side view of an inner link of one embodiment of the present invention.
Figure 3:
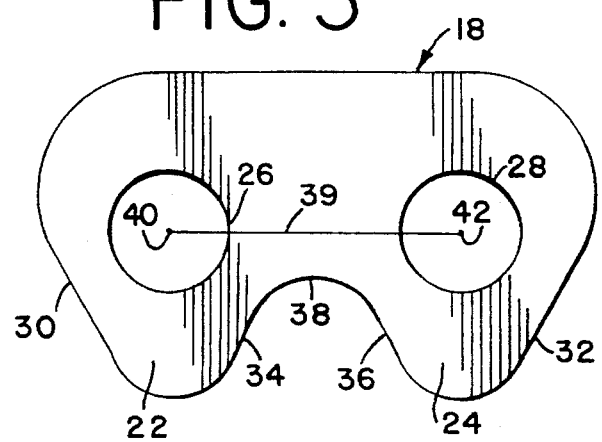
FIG. 3 is a side view of an outer link of one embodiment of the present invention.

Turning now to the drawings, the present invention is directed to providing a self-guided chain assembly and associated sprockets. In FIG. 1, a schematic illustration of the present invention is provided showing the application of the present invention to a pair of phased or offset sprockets. Two chain assemblies 10, 12 are provided on sprocket portions 14, 16. A first chain assembly 10 includes outer links 18 and inner links 20. The inner links 20 are shown in more detail in FIG. 2 and the outer links 18 are shown in more detail in FIG. 3.

The outer links 18 are standard inverted tooth links with two depending toes 22, 24 and a pair of apertures 26, 28. The toes include outside flanks 30, 32 and inside flanks 34, 36 with the inside flanks connected by a crotch 38. The crotch extends to a height that is defined in relation to the horizontal centerline 39 that connects the centers 40, 42 of the apertures 26, 28. The outside and inside flanks may be straight or include some degree of curvature.

Similarly, the inner links 20 are standard inverted tooth links with two depending toes 44, 46 and a pair of apertures 48, 50. The toes also include outside flanks 52, 54 and inside flanks 56, 58 with the inside flanks connected by a crotch 60. The crotch also extends to a height that is defined in relation to the horizontal centerline 62 that connects the centers 64, 66 of the two apertures 48, 50.

The outer links and inner links differ in the heights of their respective crotches 38, 60. As shown in the schematic illustration of FIG. 4, the height of the crotch of the inner link may meet or exceed the centerline while the height of the crotch of the outer link ends below the centerline. Of course, the relative heights of the crotches of the inner and outer links may be altered or reversed and still be within the scope of the present invention, as long as the two crotch heights 38, 60 differ in some degree.

The outer and inner links also differ in the length that the toes extend below the link apertures. The toes 22, 24 of outer link 18 extend a further distance relative to the apertures than the distance the toes 44, 46 extend below the apertures of inner link 20.

Figure 4:
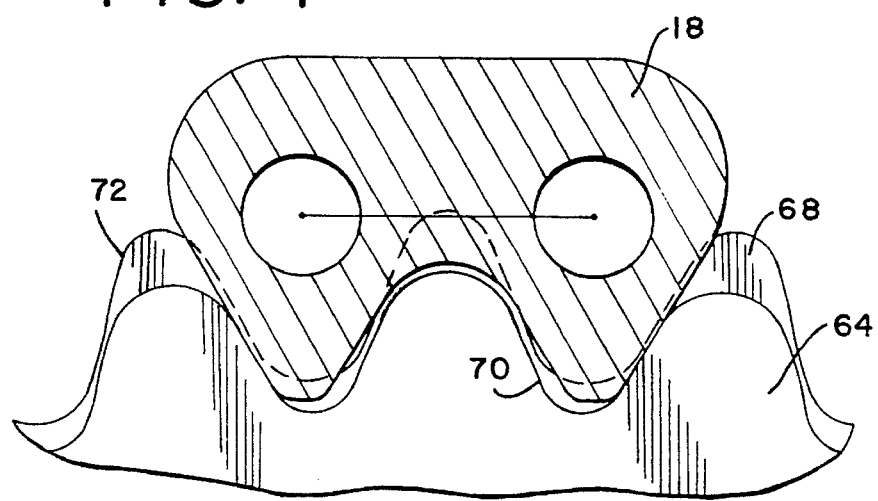
FIG. 4 is a schematic illustration of a side view of the chain of the present invention showing the outer link and matched sprocket and, in phantom view, the sprocket matched to the inner link.
Figure 9:
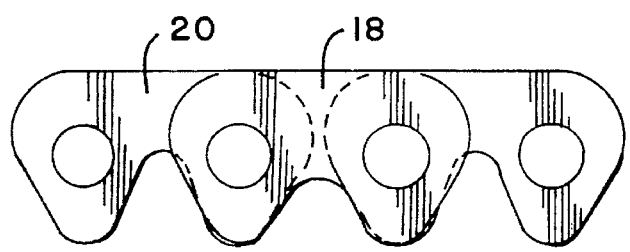
FIG. 9 is a side view of the chain assembly of FIG. 8.
Figure 8:
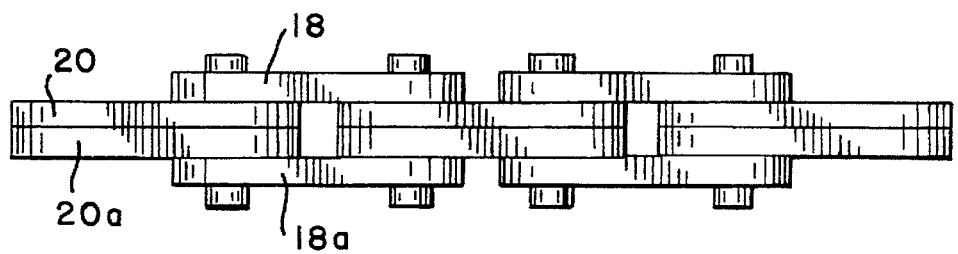
FIG. 8 is a top view of a portion of a 2×2 laced chain assembly.

As shown in FIGS. 1 and 4, the sprockets of the present invention are assembled to accommodate the different heights of the crotches of the inner and outer links. The sprockets are formed by laminates, with the outer laminates 64, 66 having a tooth profile cut to mesh with the outer links and the inner laminates 68 having a tooth profile cut to mesh with the inner links. Each portion 14, 16 of the phased sprockets includes both outer laminates and inner laminates. In the lacing shown in FIGS. 1 and 4, as well as FIGS. 8 and 9, the inner links and outer links are connected in a 2×2 lacing. That is, two inner links 20, 20*a* are interlaced with two outer links 18, 18*a* in a repeating pattern. The sprocket laminates are accordingly constructed to have two inner link sprocket portions 68 between the single outer link sprocket portions 64, 66.

Figure 10:
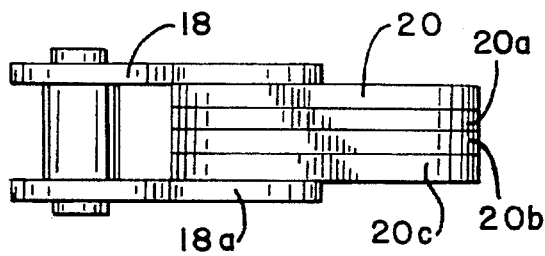
FIG. 10 is a top view of a portion of a 2×4 laced chain assembly.

FIG. 10 illustrates an alternative lacing concept. The chain of FIG. 10 is laced in a 2×4 pattern in which two outer links 18, 18*a* are interleaved with four inner links 20, 20*a*, 20*b*, 20*c*. The inner links are in a side-by-side block.

The sprocket mesh with the links of the chain assembly is shown in FIG. 4. The lower crotch of the outer link 18 meshes with a lower cut tooth profile 70 of the outer sprocket laminate 64. The higher crotch of the inner link 20 meshes with the higher cut tooth profile 72 of the inner laminate 68. As shown in FIG. 1, the higher tooth laminates 68 act in conjunction with the lower crotch outer links 18 to maintain the chain assembly on the sprocket. Thus, both inner links 20 and outer links 18 provide a meshing contact with the sprocket and act to self-guide the chain without conventional guide links.

The preferred embodiment of the present invention is an application for an engine timing system. In the engine timing system, the width of the chain is limited by the package size of the timing system. In the phased timing system of the present invention, the two phased chains include 2×2 interlaced inner and outer links.

Figure 5:
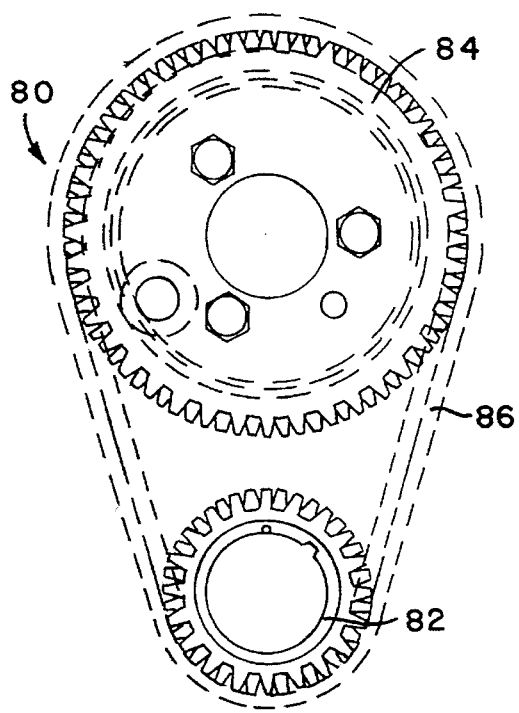
FIG. 5 is an illustration of a timing chain system having a single camshaft and crankshaft for use with the present invention.
Figure 6A:
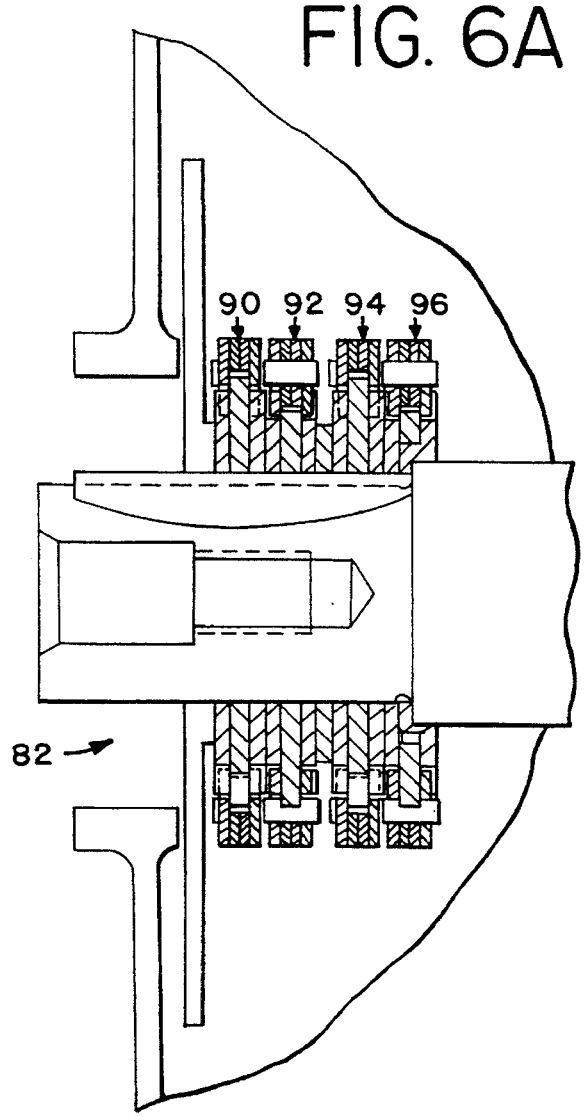
FIG. 6A is a sectional view of a crankshaft of an engine timing system having the chain assembly of the present invention.
Figure 6C:
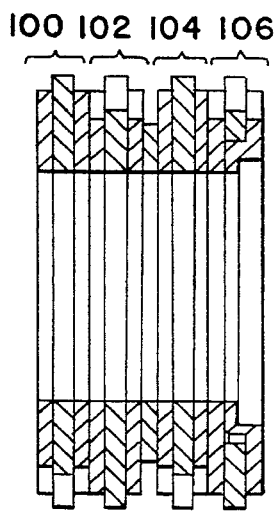
FIG. 6C is a sectional view of the sprocket of FIG. 6A.
Figure 6B:
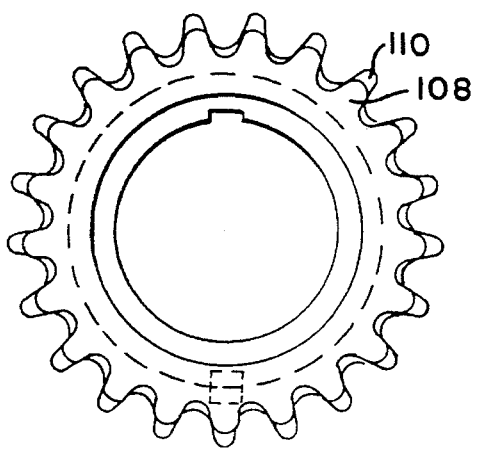
FIG. 6B is a side view of the sprocket of FIG. 6A.
Figure 7:
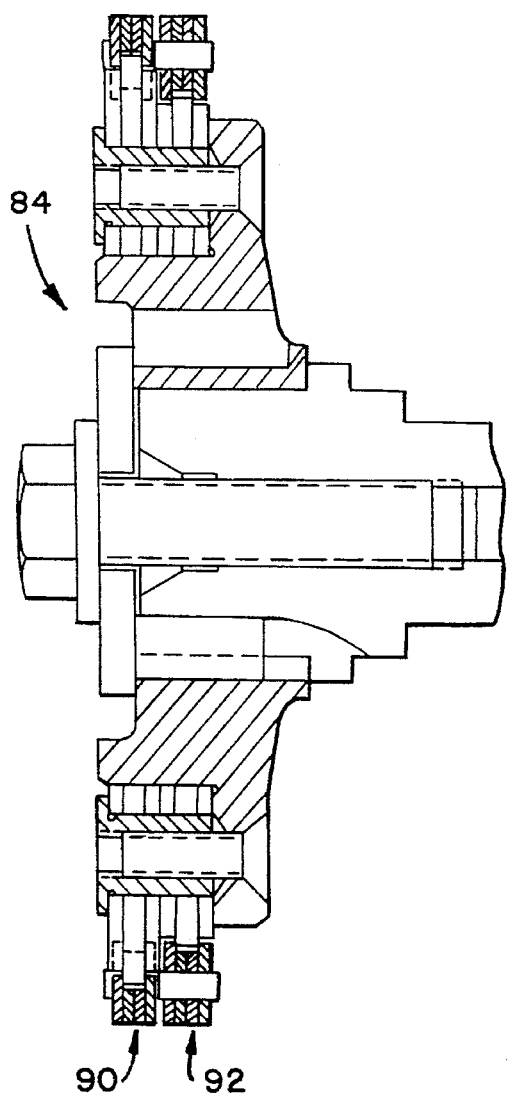
FIG. 7 is a sectional view of a camshaft of an engine timing system having the chain assembly of the present invention.

A portion of the overall engine timing system is shown in FIG. 5. The system 80 includes a crankshaft sprocket 82 and a camshaft sprocket 84 and chain drive 86. The crankshaft sprockets and chain assemblies are shown in more detail in FIGS. 6A, 6B and 6C while one camshaft sprocket and chain assembly is shown in more detail in FIG. 7. The crankshaft sprockets drive four separate chain assemblies 90, 92, 94, 96 with each chain having two outer links interlaced with two inner links. The corresponding four portions of the sprockets 100, 102, 104, 106 include sections or portions to mesh with the outer and inner links of each separate chain assembly. The sprocket laminates are shown in a side view in FIG. 6B, with lower crotch meshing teeth 108 for the outer links and higher crotch meshing teeth 110 for the inner links. The chain assemblies 90, 92 each include inner and outer links and the assemblies are phased or offset by one-half pitch. The assemblies 90, 92 drive the camshaft 84, shown in FIG. 7, which includes sprocket portions also phased by one-half pitch. The remaining crankshaft chain assemblies 94, 96 are phased one-half pitch and drive another camshaft (not shown).

In operation, the outer links will mesh with the outer portions of the sprockets while the inner links will mesh with the inner portions of the sprockets. The different crotch heights will cause the outer links to act as guide links and maintain the chain on the sprocket. But unlike traditional guide links, the outer links will have a driving contact with the sprocket through link tooth to sprocket tooth contact.

Figure 11:
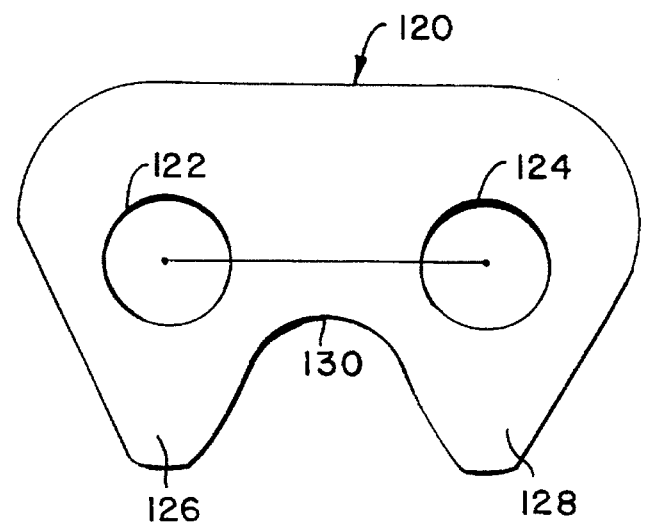
FIG. 11 is a side view of an outer link of another embodiment of the present invention.
Figure 12:
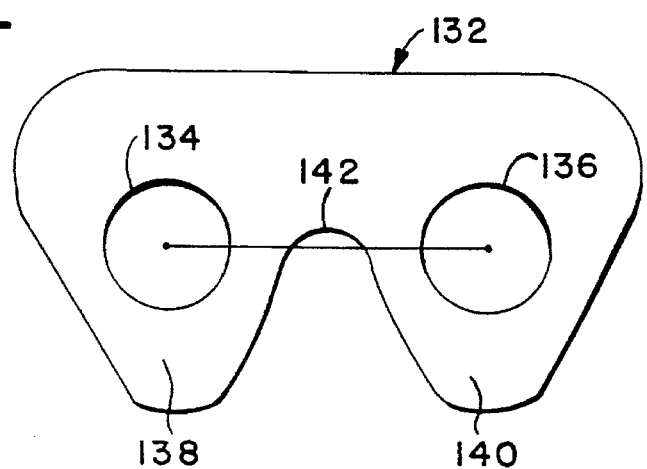
FIG. 12 is a side view of an inner link of another embodiment of the present invention.
Figure 13:
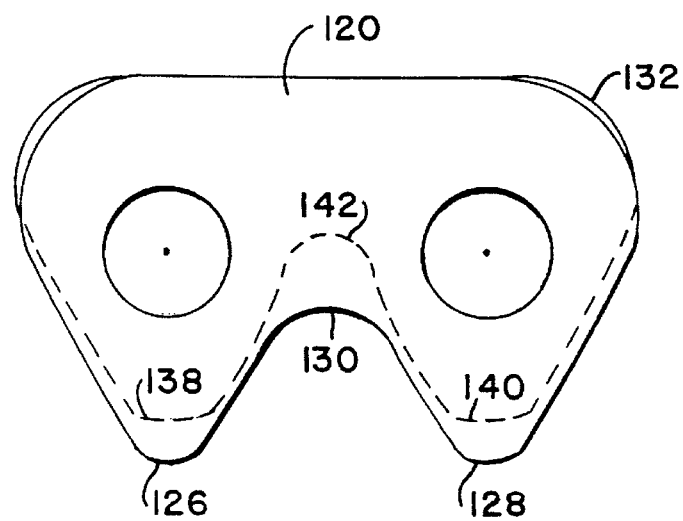
FIG. 13 is a side view of an outer link of another embodiment of the present invention with an inner link shown in phantom.

Another embodiment of the links of the chain assembly of the present invention is shown in FIGS. 11–13. In FIG. 11, the outer link 120 includes a pair of apertures 122, 124 and depending toes 126, 128. The crotch 130 connects the toes 126, 128 below the horizontal centerline between the centers of the apertures.

In FIG. 12, the inner link 132 includes a pair of apertures 134, 136 and depending toes 138, 140. The crotch 142 extends above the horizontal centerline between the apertures.

FIG. 14 illustrates the differences in crotch height and toe length of the two link profiles. The crotch 142 of the inner link 132 is at a higher point relative to the crotch 130 of the outer link 120. The toes 138, 140 of the inner link 132 do not extend as far down from the apertures as the toes 126, 128 of the outer link 120.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A silent chain assembly, comprising:

a plurality of interleaved inner and outer links, said links being adapted to contact the teeth of a sprocket, pivot members connecting adjacent links, each link having a pair of apertures for receiving said pivot members, said outer links having a pair of depending toes extending downward below the apertures and defining a crotch therebetween said crotch having a height of a vertical distance extending between the lowest point on the toe to the highest point on the crotch, said toes having flanks that contact the teeth of a sprocket, said inner links having a pair of depending toes extending downward below the apertures and defining a crotch therebetween said crotch having a height of a vertical distance extending between the lowest point on the toe to the highest point on the crotch, said toes having flanks that contact the teeth of a sprocket, and said inner links each having a crotch of a first height, said outer links having a crotch of a second height, said second height being different from said first height.

2. The silent chain assembly of claim 1 wherein said first height is greater than said second height.

3. The silent chain assembly of claim 1 wherein said chain assembly is formed of sets of interleaved links, some sets of links being formed of inner links only, and other sets of links being formed of outer links only.

4. The silent chain assembly of claim 3 wherein said sets of inner links are assembled in block fashion.

5. The silent chain assembly of claim 2 wherein said first height extends beyond a horizontal centerline extending between said link apertures.

6. The silent chain assembly of claim 5 wherein said second height is below a horizontal centerline extending between said link apertures.

7. A silent chain and sprocket assembly, comprising:

a chain assembly having a plurality of interleaved inner and outer links, said links being adapted to contact the teeth of a sprocket, pivot members connecting adjacent sets of links, each link having a pair of apertures for receiving said pivot members, a sprocket having a plurality of portions, each of said portions having a plurality of spaced teeth, said chain outer links each having a pair of depending toes defining a crotch therebetween, some of said outer links being located on a first longitudinal side of said chain and having toes positioned to contact the teeth of a first portion of said sprocket, others of said chain outer links being located on the other longitudinal side of said chain and having toes positioned to contact the teeth of a second portion of said sprocket, said chain inner links each having a pair of depending toes defining a crotch therebetween, said inner links being located between said longitudinal positions of said outer links, said inner links having toes positioned to contact the teeth of a third portion of said sprocket, said third portion of said sprocket being located between said first and second portions of said sprocket, said chain inner links each having a crotch of a first height, said outer links each having a crotch of a second height, said second height being different from said first height.

8. The chain and sprocket assembly of claim 7 wherein said sprocket teeth in said first portion have a profile that meshes with said outer links, said sprocket teeth in said third sprocket portion having a profile that meshes with said inner links.

9. The chain and sprocket assembly of claim 7, wherein said assembly includes first and second driving sprockets connected to a drive shaft, said first and second driving sprockets having a plurality of spaced teeth, said driving sprockets being disposed in parallel relationship along said drive shaft, the location of the teeth of said first driving sprocket being circumferentially offset with respect to the corresponding teeth of said second driving sprocket, first and second driven sprockets connected to a driven shaft, said first and second driven sprockets having a plurality of spaced teeth, said driven sprockets being disposed in parallel relationship along said driven shaft, the location of said teeth first driven sprocket being offset with respect to the corresponding teeth of said second driven sprocket, said drive shaft being operatively connected to a power input and said driven shaft being operatively connected to a power output, said first driving sprocket being aligned with said first driven sprocket and having a first chain assembly drivingly connecting said first driving sprocket with said first driven sprocket, said second driving sprocket being aligned with said second driven sprocket and having a second chain assembly drivingly connecting said second driving sprocket with said driven sprocket, said first and a second chain assemblies having a plurality of interleaved sets of inverted tooth links, all of said links having inverted teeth, said teeth having flanks that contact the teeth of at least one of said sprockets.

10. The chain and sprocket assembly of claim 9 wherein each of said first and second driving and driven sprockets are separate and in a spaced-apart relation.

11. The chain and sprocket assembly of claim 9 wherein at least one of said first and second chain assemblies drivingly contacts a third sprocket.

12. The chain and sprocket assembly of claim 9 wherein each of said first sprockets are offset from each of said second sprockets by one-half pitch.

13. The chain and sprocket assembly of claim 9 wherein each of said first sprockets are offset from each of said second sprockets by one-third pitch.

14. The chain and sprocket assembly of claim 9 wherein said first and second driving sprockets further comprise first and second crankshaft sprockets connected to an engine crankshaft, said first and second driven sprockets further comprise first and second camshaft sprockets connected to an engine camshaft, said drive shaft further comprises said engine crankshaft, said driven shaft further comprises said engine camshaft.

15. A silent chain assembly, comprising:

a plurality of interleaved inner and outer links, said links being adapted to contact the teeth of a sprocket, pivot members connecting adjacent sets of links, each link having a pair of apertures for receiving said pivot members, said outer links having a pair of depending toes defining a crotch therebetween, said toes having flanks that contact the teeth of a sprocket, said inner links having a pair of depending toes defining a crotch therebetween, said toes having flanks that contact the teeth of a sprocket, and said toes of said inner links extending a first distance below said inner link apertures, said toes of said outer links extending a second distance below said outer link apertures, said first distance being different from said second distance.

16. The silent chain assembly of claim 15 wherein said first distance is less than said second distance.

17. The silent chain assembly of claim 15 wherein said chain is formed of sets of interleaved links, some sets of links being formed of inner links only, and other sets of links being formed of outer links only.

\* \* \* \* \*